US008190923B2

(12) United States Patent
Daverman et al.

(10) Patent No.: US 8,190,923 B2
(45) Date of Patent: May 29, 2012

(54) METHOD TO SECURELY INITIALIZE, PROTECT AND RECOVER SYSTEM DATE/TIME

(75) Inventors: Kurt Daverman, San Jose, CA (US); Rajagopal K. Venkatachalam, Redmond, WA (US); Zhangwei Xu, Redmond, WA (US); Isaac P. Ahdout, Bellevue, WA (US); Ricardo Lopez-Barquilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1101 days.

(21) Appl. No.: 11/312,021

(22) Filed: Dec. 20, 2005

(65) Prior Publication Data
US 2007/0143462 A1 Jun. 21, 2007

(51) Int. Cl.
*G06F 11/30* (2006.01)
(52) U.S. Cl. ........................................................ 713/194
(58) Field of Classification Search .................... 713/194
See application file for complete search history.

(56) References Cited

U.S. PATENT DOCUMENTS

| 5,001,752 | A | * | 3/1991 | Fischer | 713/178 |
| 5,771,347 | A | * | 6/1998 | Grantz et al. | 726/31 |
| 5,802,545 | A | * | 9/1998 | Coverdill | 701/35 |
| 5,925,127 | A | * | 7/1999 | Ahmad | 726/31 |
| 6,119,934 | A | * | 9/2000 | Kolls | 235/381 |
| 6,185,688 | B1 | * | 2/2001 | Greaves et al. | 726/36 |
| 6,618,810 | B1 | * | 9/2003 | Dirie | 726/27 |
| 6,738,810 | B1 | * | 5/2004 | Kramer et al. | 709/224 |
| 6,889,212 | B1 | * | 5/2005 | Wang et al. | 705/59 |
| 2003/0171985 | A1 | * | 9/2003 | Prabhu et al. | 705/14 |
| 2005/0043999 | A1 | * | 2/2005 | Ji et al. | 705/21 |
| 2005/0097441 | A1 | * | 5/2005 | Herbach et al. | 715/501.1 |

FOREIGN PATENT DOCUMENTS
WO   WO 2004057828 A1 * 7/2004
* cited by examiner

*Primary Examiner* — Nasser Moazzami
*Assistant Examiner* — Michael S McNally

(57) ABSTRACT

The claimed method and system monitors computer system timer(s) relative to other timers to detect discrepancies and/or may capture an offset to provide a method of more accurately determining a current time. The invention may also provide a method to detect power source tampering using a last known good time and may provide a means to securely initialize system time using an encrypted time stamp.

15 Claims, 14 Drawing Sheets

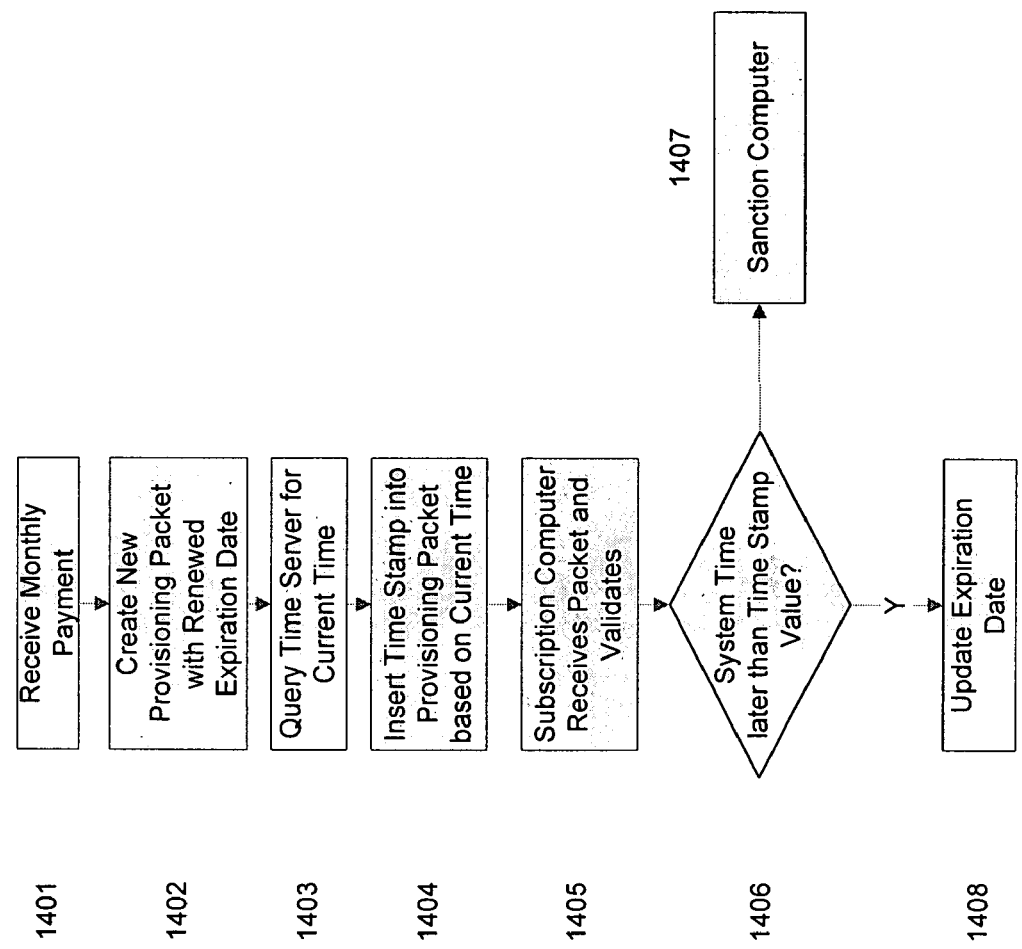

METHOD TO SECURELY INITIALIZE, PROTECT AND RECOVER SYSTEM DATE/TIME

BACKGROUND

In a pay-per-period computing model, an accurate timer/clock is necessary to ensure correct billing and allocation of services. The temptation may exist to tamper with the clock to obtain free services. Existing computer systems may not provide secure system clocks. For example, existing computer systems may be susceptible to user tampering of clock date and time values. This may be unacceptable in a billing model which relies on an accurate system clock to determine when a user has consumed an allocated amount of computer usage or when an expiration date has passed, requiring further deposit of funds for continued use.

SUMMARY

A method and system for securing timers and timing information from being tampered with is disclosed. The method and system may monitor a computer system timer(s) for discrepancies in its timing information relative to other timers and/or may capture (e.g., store in a protected register) an offset (difference) between an actual system time and a user time to provide a method of more accurately determining a current time. The invention may also provide a method to detect power source tampering and may provide a means to securely initialize system time.

DRAWINGS

Figure 8:
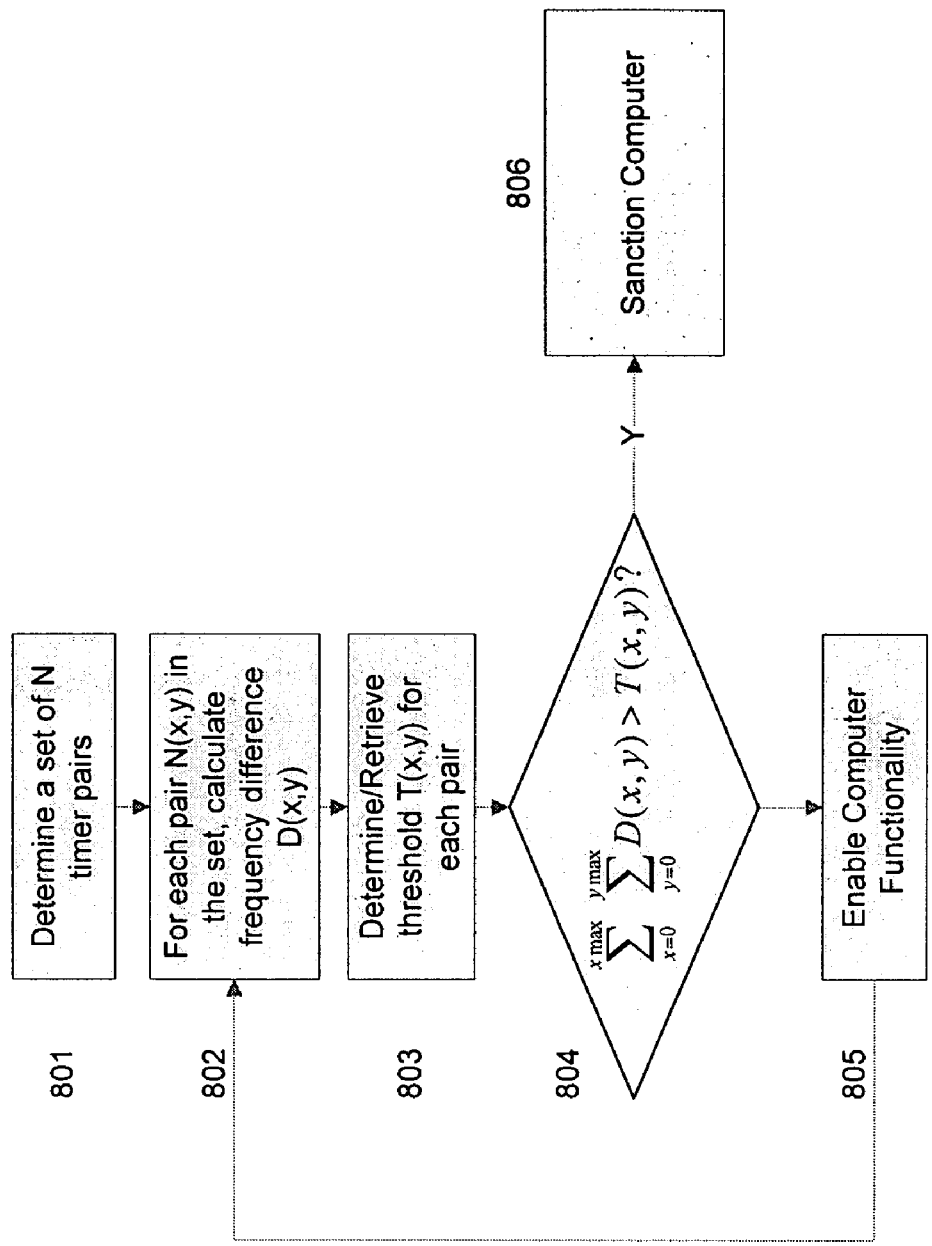
FIG. 8 illustrates a process of using differences between a set of clock/timer frequencies to determine tampering.
Figure 10:
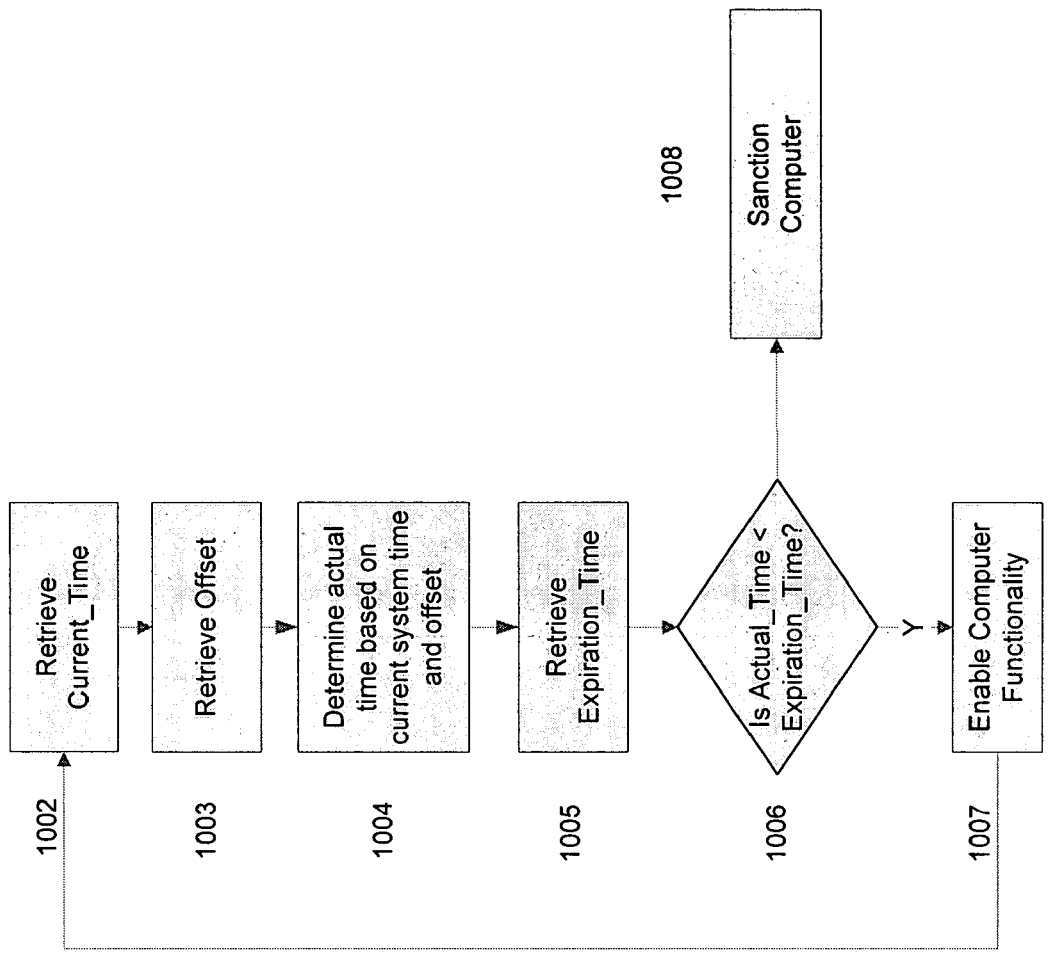
Figure 11:
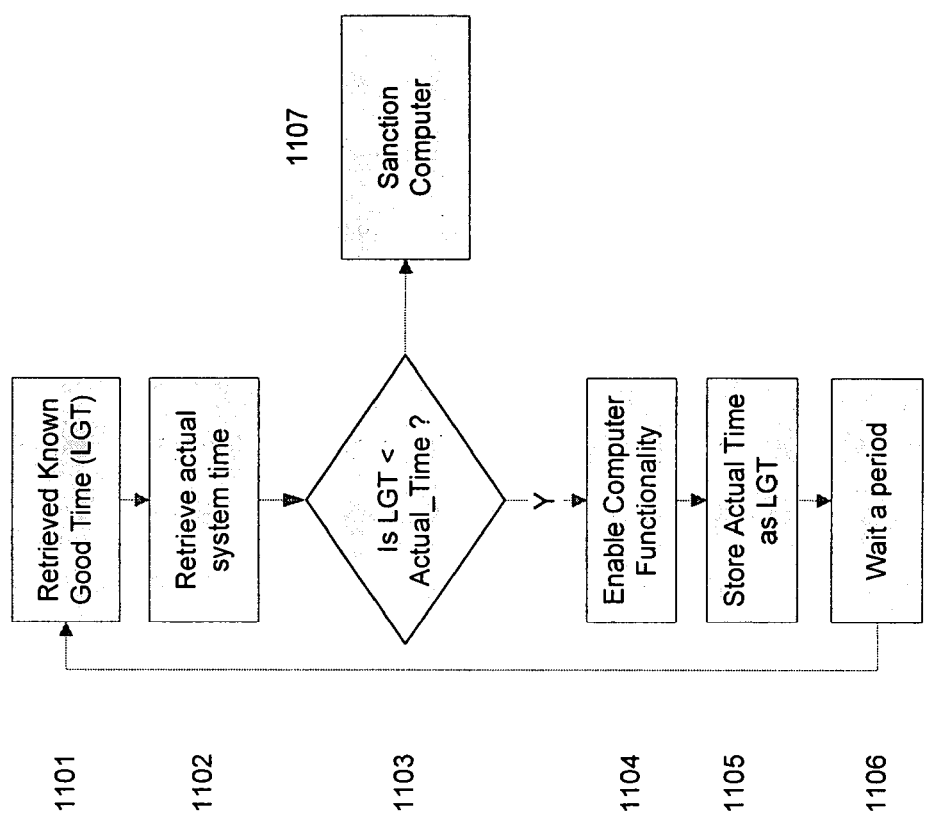
Figure 12:
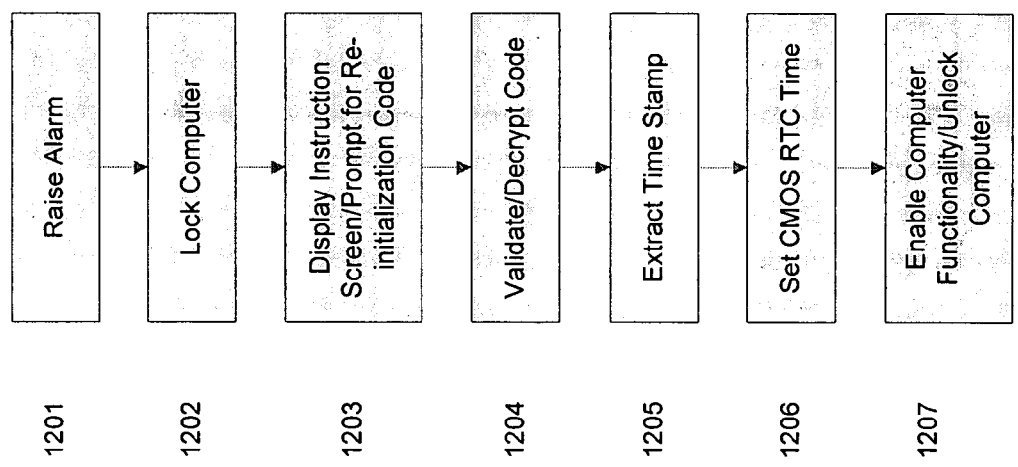
Figure 13:
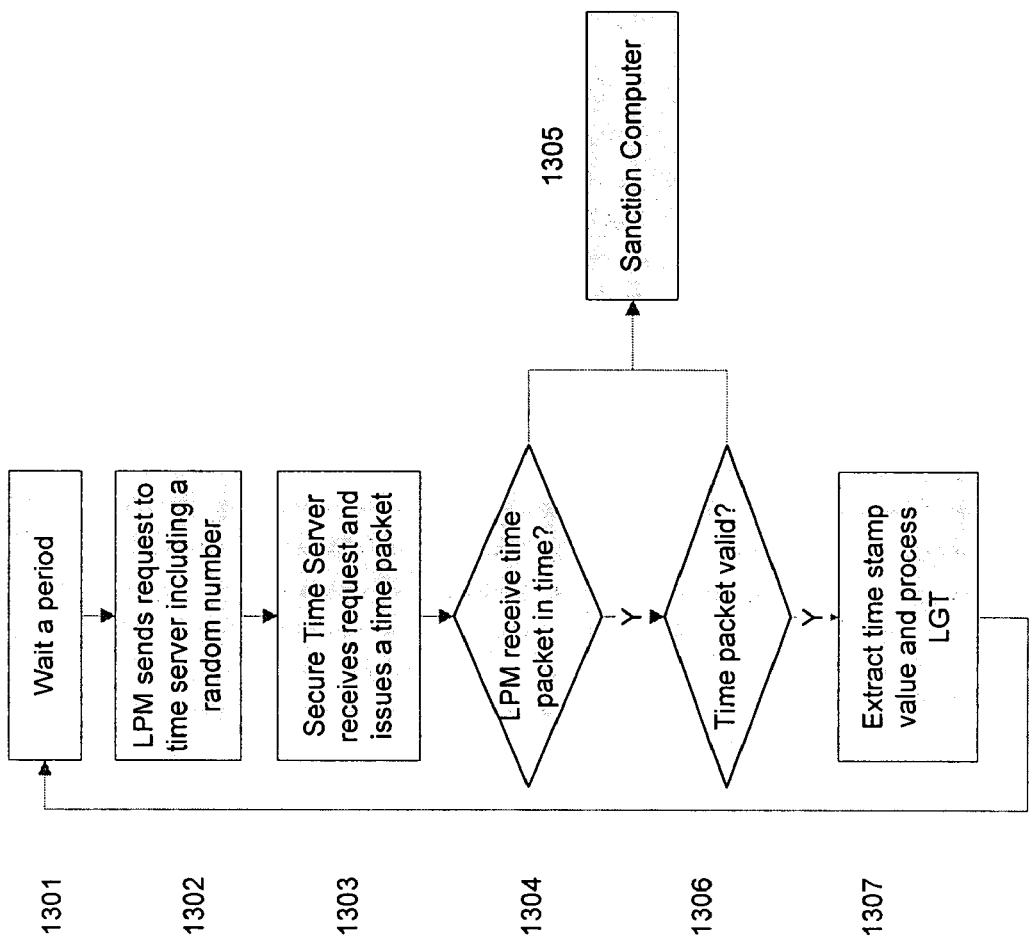

FIG. 10 further illustrates a subscription model that is modified to use the process of FIG. 8 to determining a subscription expiration time;

FIG. 11 illustrates a power source protection embodiment using a last known good time value;

FIG. 12 illustrates a re-initialization process for a power source protection embodiment;

FIG. 13 illustrates a re-initialization process using a secure time server to provide an LGT; and FIG. 14 illustrates a re-initialization process for a subscription model using a secure time server.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
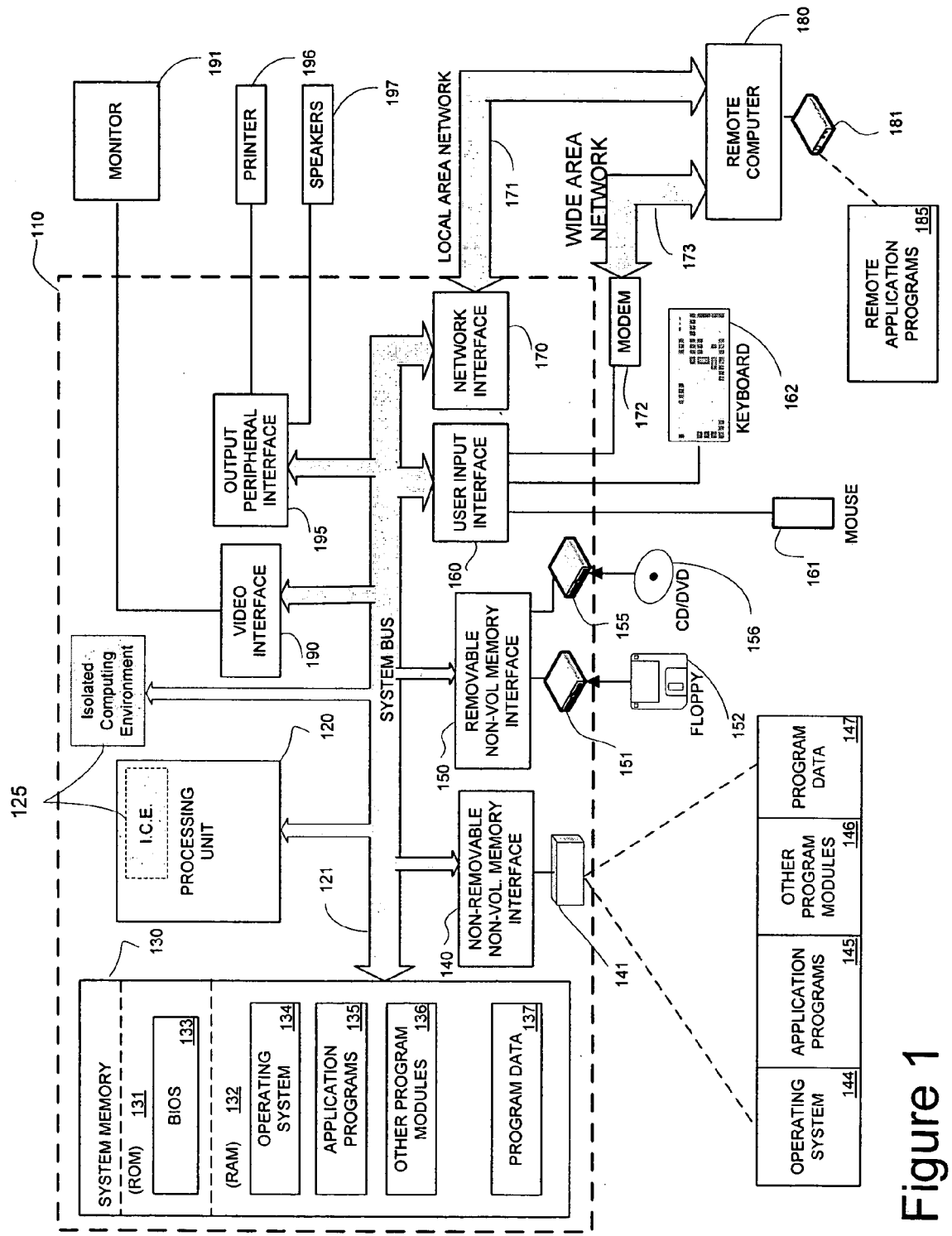
FIG. 1 is a simplified and representative block diagram of a computer.

FIG. 1 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS) may contain basic routines that help to transfer information between elements within computer 110. The BIOS 133 may be called firmware, or a software program contained on a non-volatile hardware chip, such as ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media 140, 150. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The BIOS 133 may provide support for the devices and features of the computer 110, e.g., hard drives 141, floppy drives 152, interfaces 190, memory 132, etc. The BIOS 133 provides initial system configuration functionality even before a software operating system such as Windows is initiated. The BIOS operates together with two other motherboard components (not shown in FIG. 1): a CMOS chip, sometimes known as the RTC/NVRAM (Real-Time-Clock/Non-Volatile RAM) chip and a battery. The CMOS chip stores the settings that are used with the BIOS configuration program in a portion of memory (which may be 64 bytes of memory in some systems) and contains the system's Real-Time-Clock (RTC) circuit. Power from a battery attached to the motherboard is used by the CMOS to keep its settings, which may in some cases be built into the real-time clock package itself. The RTC runs off the same power source as the system CMOS.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

An isolated computing environment 125 may be used to implement a supervisor, a trusted computing base, or other secure environment and may be used to monitor, measure, and/or sanction the computer 110 when policies established for use are not followed. The policies may reflect the terms of an agreement between a user of the computer 110 and a service provider with an interest in the computer 110. The isolated computing environment 125 is discussed in more detail with respect to FIG. 2, below.

The isolated computing environment 125 may be instantiated in more than one manner. When implemented by one or more discrete components, the isolated computing environment 125 may be disposed on the motherboard (not depicted) of the computer. Ideally, the removal or de-lidding of the isolated computing environment 125 causes permanent damage to the motherboard and/or surrounding components and renders the computer 110 inoperable.

Another instantiation of the isolated computing environment 125 may be as depicted in FIG. 1, where the isolated computing environment 125 is incorporated in the processing unit 120. Being so disposed in the processing unit may offer advantages of better access to processing unit registers and monitoring of data sequences as well as improved resistance to physical attacks.

When an attested boot process exists, the isolated computing environment 125 may be implemented in software because the boot process can guarantee execution cycles and a certified operating environment. In such a case, the isolated computing environment 125 may not require a separate processor but may be run from the main processing unit 120. When an attested boot is not available, a hardware implementation of the isolated computing environment 125 may be recommended.

A license provisioning module, or LPM (see FIGS. 3 & 4), may be incorporated to measure and authorize use of the computer in a pay-per-use or pay-per-period configuration. The license provisioning module may also be referred to as a lower provisional module. The LPM, when implemented in software, may be stored in nonvolatile memory 146 and executed from memory 136. When the LPM is implemented in software, it may be vulnerable to attack. One purpose of the supervisor (see FIGS. 3 & 4) and/or isolated computing environment 125 may be to act as a watchdog over the LPM to help ensure its integrity and correct function.

In an alternate embodiment, the isolated computing environment 125 may assume the role of the LPM with respect to valid hardware configuration of the computer. That is, the separately-booted isolated computing environment 125 may have configuration data that allows operation of the computer according to its licensed capability, the licensed capability being less than that potentially available. For example, the computer may be capable of running with 512 megabytes (MB) of random access memory (RAM), but the valid configuration specifies 256 megabytes of RAM. The isolated computing environment 125 may limit the function of the computer to the 256 MB of system memory. Similar restrictions may be enforceable with respect to processor clock rate, available cache memory, number of cores of the processor 120 available, graphics card functions, hard drive capacity, networking options, or internal bus drivers. From an implementation perspective, there is little or no difference between imposing a limitation based on a monitored activity or enforcing a limitation based on a pre-determined setting or license.

Figure 2:
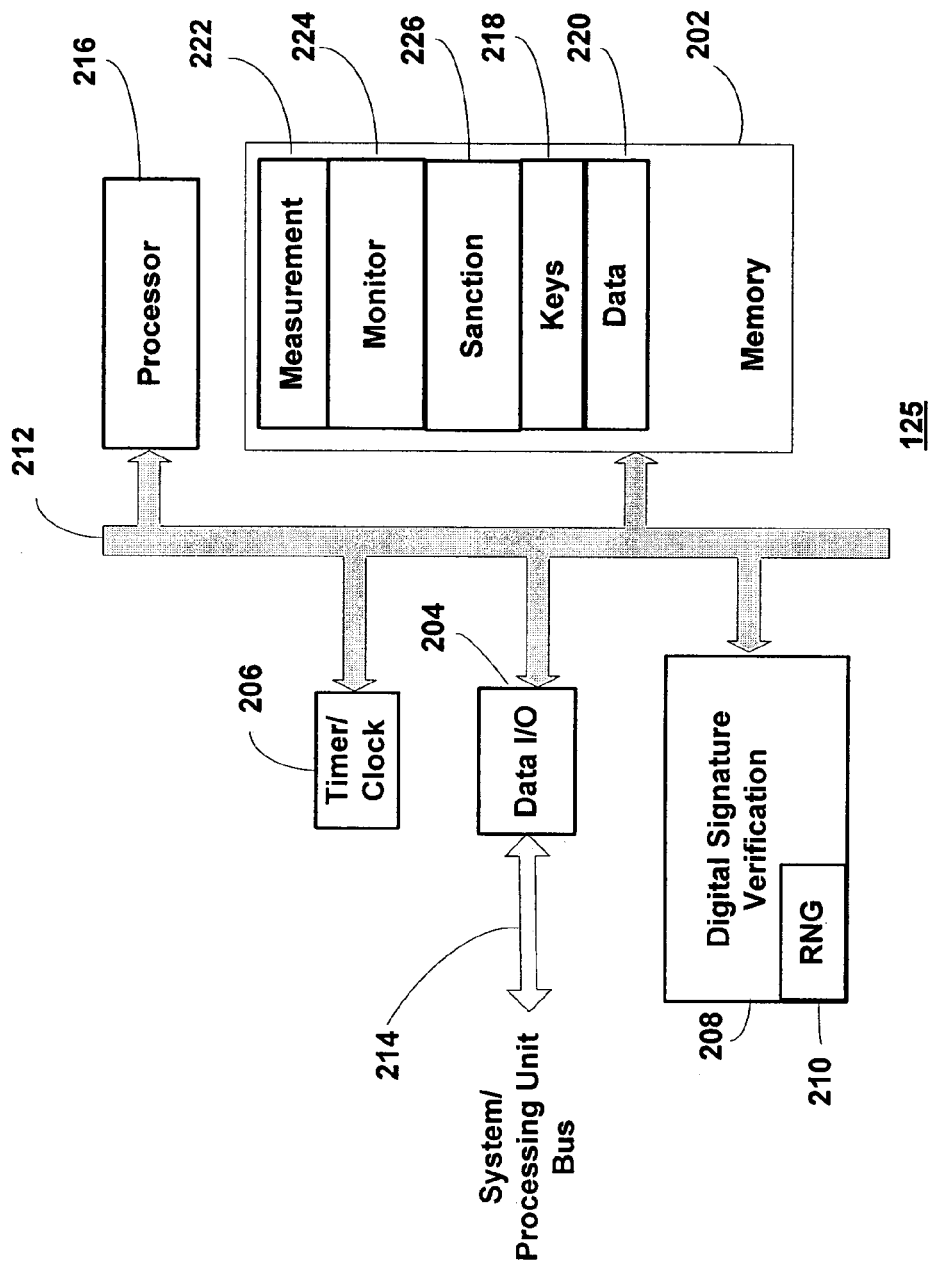
FIG. 2 is a block diagram of a simplified isolated computing environment.

Referring to FIG. 2, a simplified and representative isolated computing environment is discussed and described. The isolated computing environment may be or may be similar to the isolated computing environment 125 introduced above. The isolated computing environment 125 may include a memory 202, both volatile and non-volatile, a data input/output circuit 204 and a timer or clock 206. For example, a timer 206 may be used to implement the clock function by counting intervals of real time.

The isolated computing environment 125 may further include a digital signature verification circuit 208. When one-way verification of an external entity is required, for example, verification of a server (not depicted), a random number generator 210 may be a part of the digital signature verification circuit 208. Digital signature technology is well known and hashing, signature verification, symmetric and asymmetric algorithms and their respective keys are not discussed here in detail.

The blocks of the isolated computing environment 125 may be coupled by a bus 212. The bus 212 may be separate from a system or processing unit bus 214 used for external access. Separate busses may improve security by limiting access to data passed by bus 212. The bus 212 may incorporate security precautions such as balanced data lines to make power attacks on cryptographic keys 216 stored in the memory 202 more difficult.

A processor 216 may be available for execution of programs. As discussed above, when an attested boot is not available, the processor 216 may be included to provide the isolated computing environment 125 with guaranteed computing capability and separation from the operating system 134.

The memory 202, may, in addition to storing cryptographic keys 216, store data 220 that may include operational information, such as, a current score associated with compliance, or system information, such as, specific contractual information. Measurement data 222 may be associated with a monitor program 224. The monitor program 224 may be used to take measurements, receive information about the current operation of the computer 110, and determine a compliance score. The sanction program 226 may be invoked when the compliance score is below a predetermined threshold. The sanction program 226 may be capable of triggering both software and hardware mechanisms for impairing or disabling the computer 110.

Figure 3:
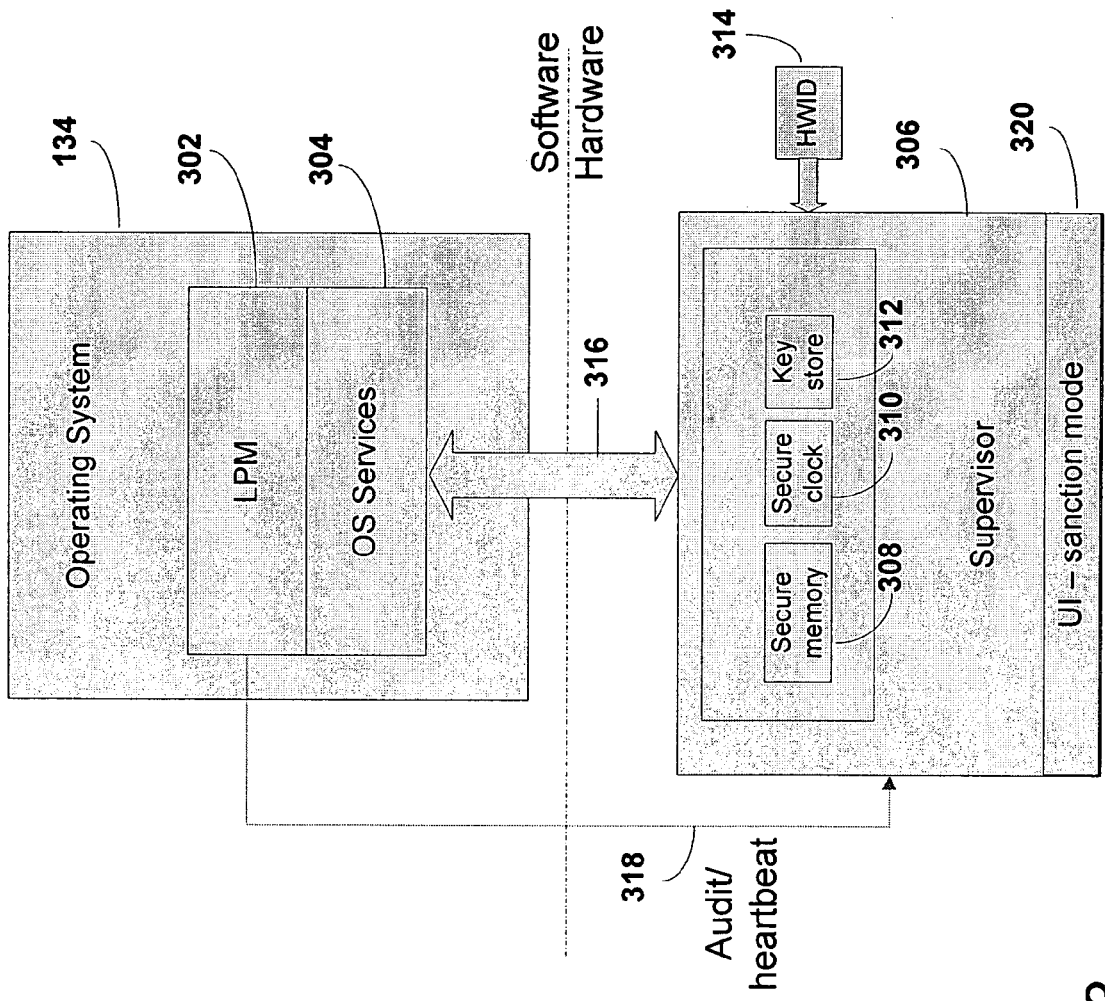
FIG. 3 is a simplified and exemplary block diagram illustrating an embodiment of a supervisor.

FIG. 3 illustrates an exemplary embodiment of a computer 110, showing the relationship of hardware and software components associated with pay-per-use or pay-per-period computing. The operating system 134 of FIG. 1 may support the LPM 302 and operating system services 304 associated with the pay-per-period operation. The operating system services 304 may include secure time, secure store, and encrypt/decrypt. In this embodiment, elements of the isolated computing environment 125 are configured as a supervisor 306. The supervisor 306 may include a secure memory 308, a secure clock 310 (discussed further below), and a cryptographic key store 312. A unique hardware identifier 314 may be available to the supervisor 306 for use in processing provisioning packets and in identifying the computer 110 to an outside entity.

The secure memory 308 may be a separate memory area accessible only by the isolated computing environment 125, and/or only after cryptographic authentication. The secure clock 310 may provide a tamper-resistant time base providing monotonically increasing time for the life of the computer. The secure clock 310 may be used for interval timing or as a calendar base. The cryptographic key store 312 may provide storage for cryptographic keys. The key store 312 may be essentially a write-only memory and include cryptographic algorithms such that calculations are performed within the key store and only results are provided. Keys may not be read from the key store 312 once written and verified.

The supervisor 306, and its underlying isolated computing environment 125, may operate independently of the operating system 134. For security reasons, the supervisor 306 may boot prior to any other boot device when the computer 110 is powered on or reset. Booting independently from the operating system helps ensure that the supervisor 306 and the isolated computing environment 125 are not spoofed or starved for CPU time by another boot device.

Communication between the supervisor 306 and the operating system services 304 may be accomplished over logical communication link 316, and may be supported over physical communication bus 214. The LPM 302 may be in communication with the supervisor 306 as shown by logical link 318. The link 318 supports requests from the supervisor 306 to the LPM 302 for audit data. Additionally, the LPM 302 may send a periodic heartbeat to the supervisor 306 as an ongoing audit of system compliance. Because the supervisor 306 may completely disable the operating system 134 when a noncompliant situation is discovered, the supervisor 306 may have sufficient power and hardware access to present a sanctioned mode user interface 320 for use while the computer 110 is in the sanctioned mode.

The audit/heartbeat data may be sent over logical link 318 and may include data required to validate a software component, particularly the LPM 302. The supervisor 316 may be programmed to expect heartbeat data at a regular interval. The heartbeat data may include validation information such as a digital signature of its binary executable code, including a sequence number or other method for preventing a replay attack. The regular heartbeat, for example, from the LPM 302 may serve as evidence that the LPM is still running and when its signature is verified, that it is a correct version of the unmodified code.

In its simplest form, the supervisor 306 receives a policy, authenticates the policy, monitors for compliance, and sanctions noncompliance to the policy. The policy may be a data structure that is passed from the operating system corresponding to predetermined limits, for example, usage hours or calendar months of usage. Because the supervisor 306 is independent of the operating system, or an other boot device, the supervisor 306 may be used to enforce policies for virtually any operating system or operating environment.

Figure 4:
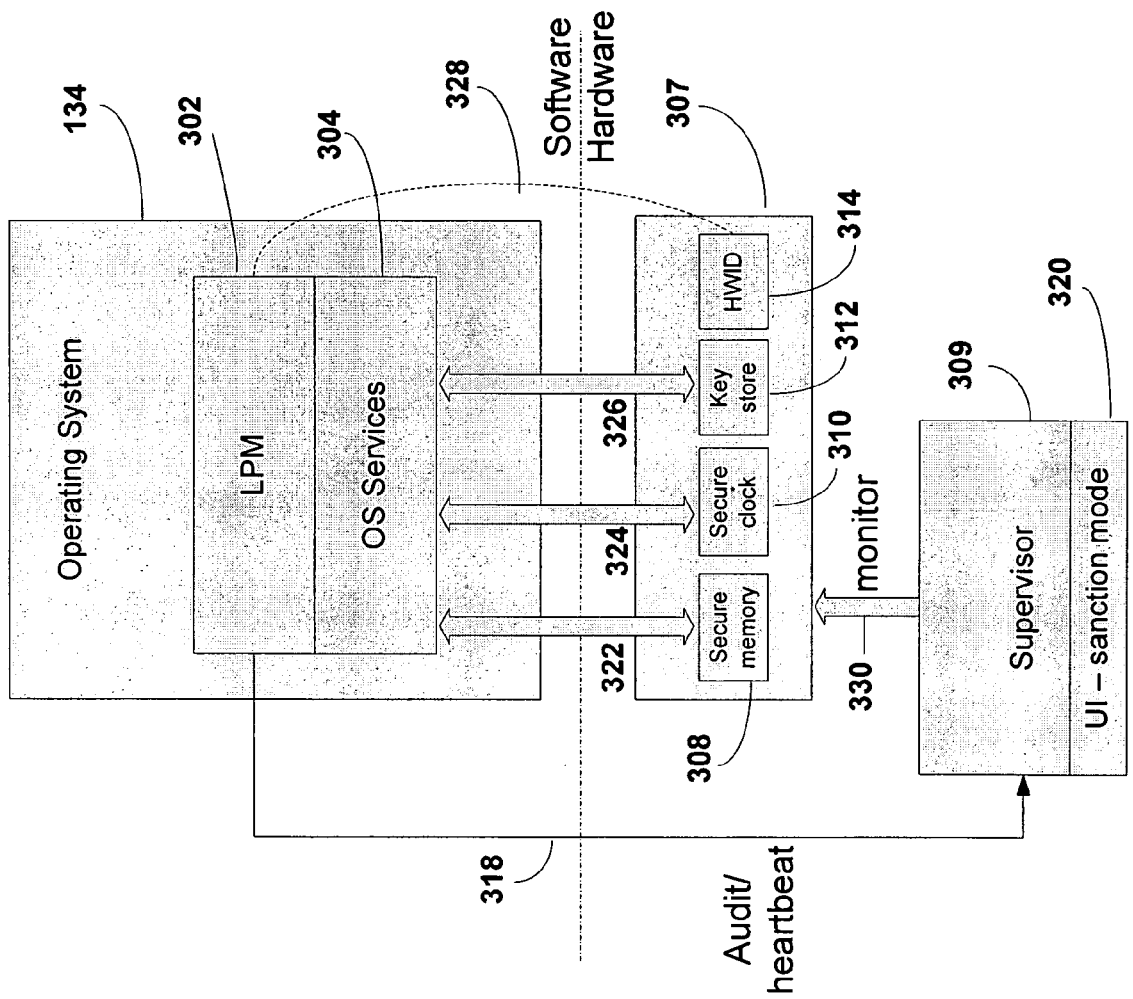
FIG. 4 is a simplified and exemplary block diagram illustrating another embodiment of a supervisor.

FIG. 4 depicts an alternate embodiment of the operating system and hardware components associated with a pay-per-use computer, such as computer 110. As in FIG. 3, the operating system 134 includes the LPM 302 and the underlying operating system services 304. A smaller supervisor 309, that also may be based on a hardware isolated computing environment 125, may only monitor system secure resources 307 via bus 330, rather than offer and maintain them as in the embodiment of FIG. 3. The secure resources 307, may have secure memory 308, the secure clock 310, the cryptographic key store 312, and the hardware identifier 314. Individual service requests to the various operating system calling entities may be made via logical connections illustrated by data paths 322, 324, 326. The audit/heartbeat logical connection 318 may be maintained between the supervisor 309 and the LPM 302. In this configuration, the hardware identifier 314 may be made available to the LPM 302 via logical connection 328, among other things, for verifying provisioning packets and for use in generating the heartbeat signal.

Figure 5:
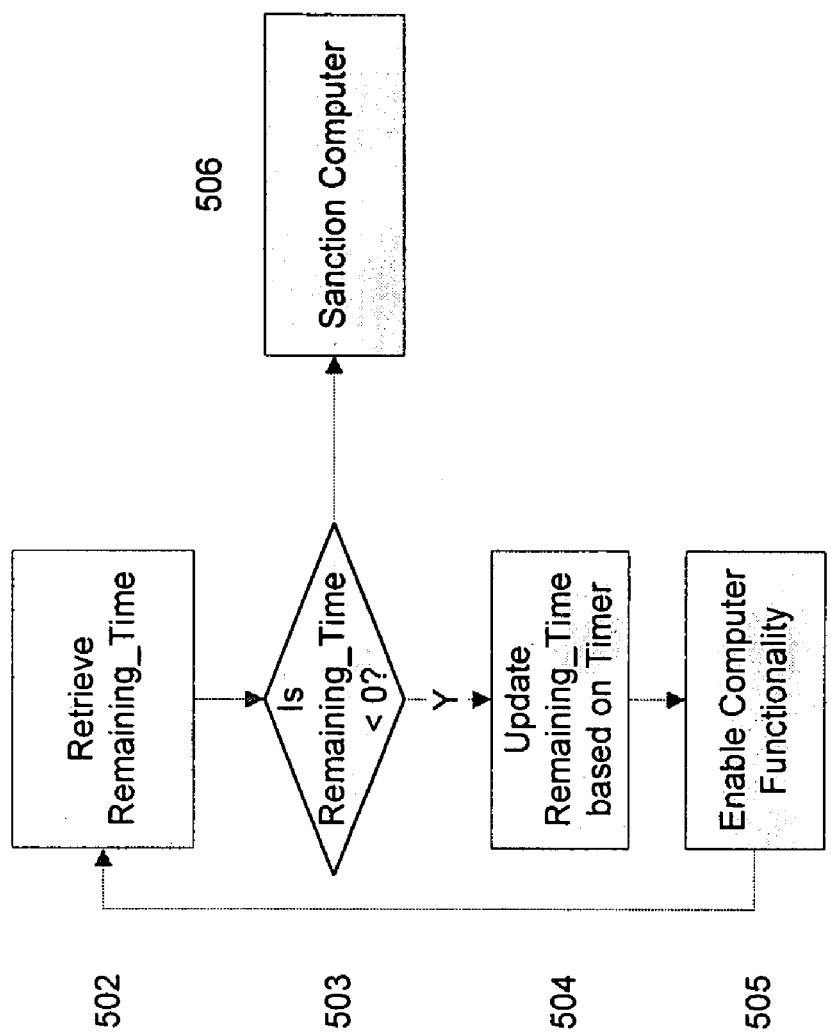
FIG. 5 illustrates a general prepaid process.

Generally, a pay per period computing model involves collecting rent from a customer and allowing the customer to use the functionality of a computer for a period of time based on the rent amount. Pay-per-period computing may involve a computer as described above in which mechanisms within the hardware and/or software of a computer enable or disable the computer's functionality (sanctioned) based on whether a customer has properly provided payment or credit validation information. Pay-per-period models may vary based on the rent collection process. For example, two types of pay-per-period models may include a prepaid model and a subscription model. The prepaid computing model involves collecting an amount of rent upfront for a fixed period of time and metering the customer's computer usage time until the customer's allotted, prepaid usage time is exhausted, after which the computer functionality is disabled. A prepaid process using an embodiment of the pay per period computing system may be illustrated in FIG. 5. In order to use the pay per period computer, a remaining prepaid usage time may be retrieved 502, e.g., from a database or from information associated with a validation process. Next the system may check to determine whether prepaid usage time is greater than zero 503 and if so, then the computer may update the usage time based on processing duration 504 and enable the computer functionality 505. If the usage time is zero then the computer may sanction the computer 506, which may include, for example, raising an alarm and/or restricting functionality.

Figure 6:
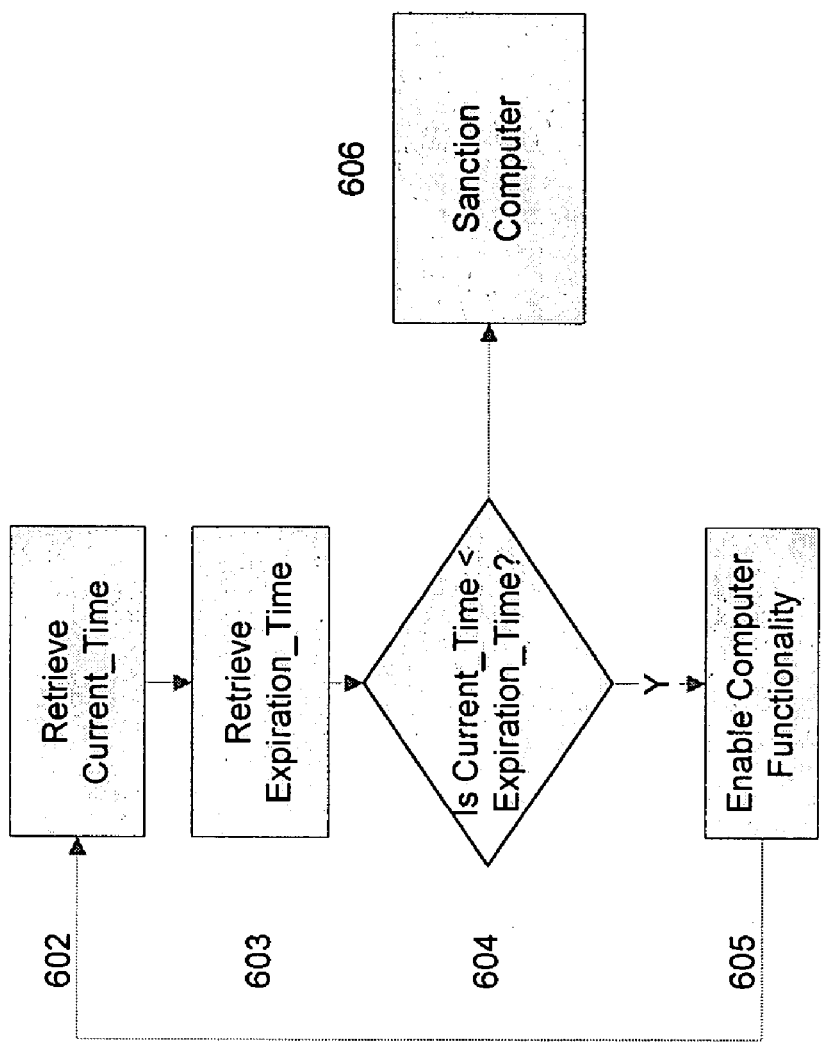
FIG. 6 illustrates a general subscription process.

The subscription model may involve an unlimited use of a computer until an expiration date/time, after which, additional validation is required to keep the computer system enabled. This validation may require verification of further deposit or credit information. FIG. 6 illustrates a general subscription process. The system may retrieve a current system time 602 and retrieve an expiration time for the user 603. The system then checks to see if the current system time is before the expiration time 604 and if so, enables computer functionality 605. If the current system time is pass the expiration time, then the system may sanction the computer 606, which may include raising an alarm and/or disable computer functionality. In addition or in conjunction with sanctioning, the computer may also execute associated processes, for example, the computer may execute a validation process. The validation process may entail determining whether a user has made a further deposit.

Because the prepaid model involves providing computer functionality for a period of time in exchange for a prepaid fee, the prepaid model requires an accurate measurement of the amount of usage time spent by a user. Metering may be based on a system timer. In a computer, however, timekeeping may be performed by more than one hardware timer. As mentioned, a PC typically contains a hardware module such as a CMOS chip that holds a Real Time Clock (RTC) circuit that keeps the date and time on your PC. A PC motherboard may also contain other hardware based timers, although some of these timers may be dependent upon the RTC. If an internal hardware timer is relied upon to measure usage duration, then it is pertinent that the timer be secure (and/or additionally that any other related timers be secure) from tampering. In the prepaid model, slowing down the period or frequency of a timer may enable a user to extend usage time beyond the user's prepaid allowance. Thus, if the CMOS clock is allowed to be tampered with, the original equipment manufacturer (OEM) or underwriter will not be able to properly monitor, police, or enforce the usage of the equipment. Accordingly, it may be useful to monitor a baseline time value and look for timer anomalies.

Figure 7:
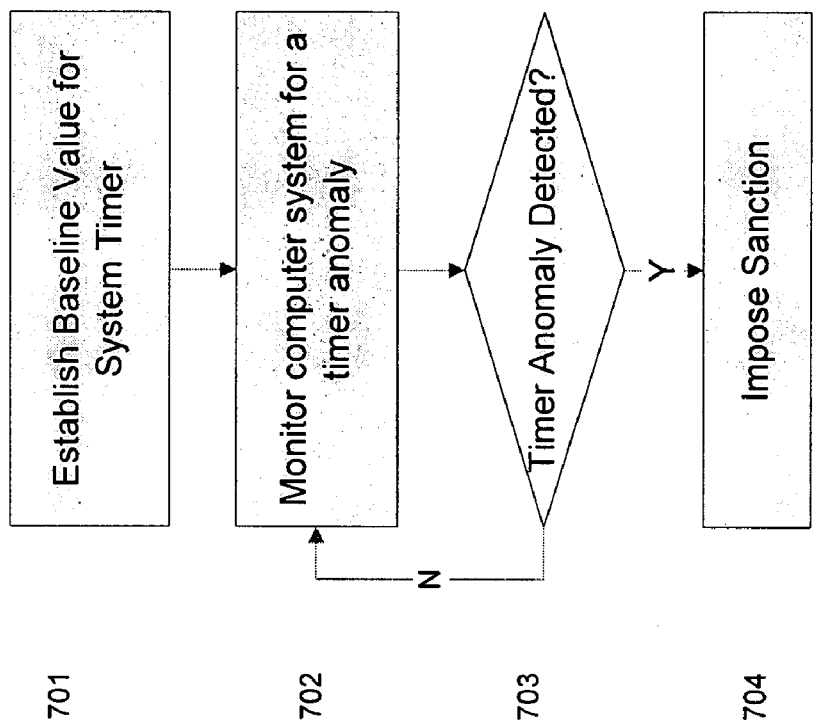
FIG. 7 illustrates a general embodiment of the claimed method and system.

FIG. 7 illustrates a general embodiment of the claimed process and system. Securing a timer or system clock may involve establishing a baseline value for the timer 701. For example, a computer system may track changes to a clock's settings so that changes may be backed out of a value calculation to obtain a correct time value or baseline value. The computer system may also monitor the computer system for a timer anomaly that indicates a possible improper timer adjustment 702. An example may be when timing information of a clock is compared to other clocks to detect improper modification. Another example involves using a last known good time value to determine whether a clock value has been moved back inappropriately. When an anomaly is detected 703, the computer system may impose a sanction 704, which may include raising an alarm and/or restricting computer functionality.

In a prepaid computing system, detection of clock tampering may be based on determining a difference between clock/timer frequencies of a set of timers that may be used for measuring usage. This embodiment may involve a personal computer (PC) hardware system that includes a plurality of internal clocks/timers. Sample timers may include CPU timers, RTC timers, south bridge or north bridge timers, etc. In one embodiment illustrated in FIG. 8, a set of timer pairs is determined 801. A difference in frequencies between the pairs of timers in the set of timers is measured 802. The periodically measured differences are then compared to corresponding thresholds 803. If a difference in a frequency pair is less than or equal to its corresponding threshold 804, then computer functionality may be enabled 805. If the difference in the frequency pair is greater than its corresponding threshold 804, this may indicate that tampering has occurred with one of the clocks in the set. In one embodiment, an alarm is raised 806 indicating that tampering has occurred with a clock/timer. This alarm may cause the pay-per-period computing system to restrict access to the computer or the implementation of a sanction.

A delay may be introduced before restarting each check cycle such that the time difference is calculated periodically. In one alternative embodiment all timers/clocks that may be capable of serving as a metering device for the usage time may be included in the timer set. In this manner, this embodiment will catch any frequency difference in the set of clocks that differs significantly from their inherent or natural frequency difference. Also, different alternative determinations of timer differences may be made that are within the scope of the invention. For example, instead of calculating differences for pairs of timers, a total frequency count may be calculated based on all the measured frequencies of all the timers in the set and this count can be compared to an aggregate threshold. Alternative mathematical equivalent models are also within the scope of this invention.

The threshold may be used to capture the inherent frequency differences between the timers. For example, if a CPU timer beats every microsecond while the RTC clock beats every second, then the threshold may account for this inherent difference in clock frequency. Additionally, the threshold value may be used to account for clock skew and clock delay as well as clock accuracy and performance. For example, even quartz crystal based clocks are not perfectly accurate (some may drift off by a couple of seconds a month), thus the threshold may account for the degree of accuracy of the timers in the set. Moreover, if the timers in the set are in any way related, e.g., they derive timing information from each other or from a common source, clock skew and clock delay should be factored into the threshold calculation. The threshold may also be adjusted and recalculated when necessary to account for aberrations which may not be attributable to tampering. For example, clock drift may be cumulative, and thus the threshold may need to account for increased drift over a period of time.

In a subscription billing model, a user pays a recurring fee over an interval, or subscription window, for unlimited access to the subscription computer during that interval. Monthly subscription intervals may be common. For example, a user may pay for usage of the computer in advance or in arrears of each month. At the end of the month, however, the user must either make payment for the next month, or pay for the previous month in order to continue to use the functionality of the computer. As described in relation to FIGS. 1-4, a pay-per-period computer may issue a sanction or restrict functionality depending on a validation process. In a subscription model, validation may include managing access based on an expiration date, e.g., the user may be allowed to use the functionality of the subscription computer until the expiration date, such as a 30 day period or one month from the subscription start date. In order to protect OEM allocation of resources, the computer may need to correctly determine when the expiration date/time has passed based on a current CMOS RTC time.

Figure 9:
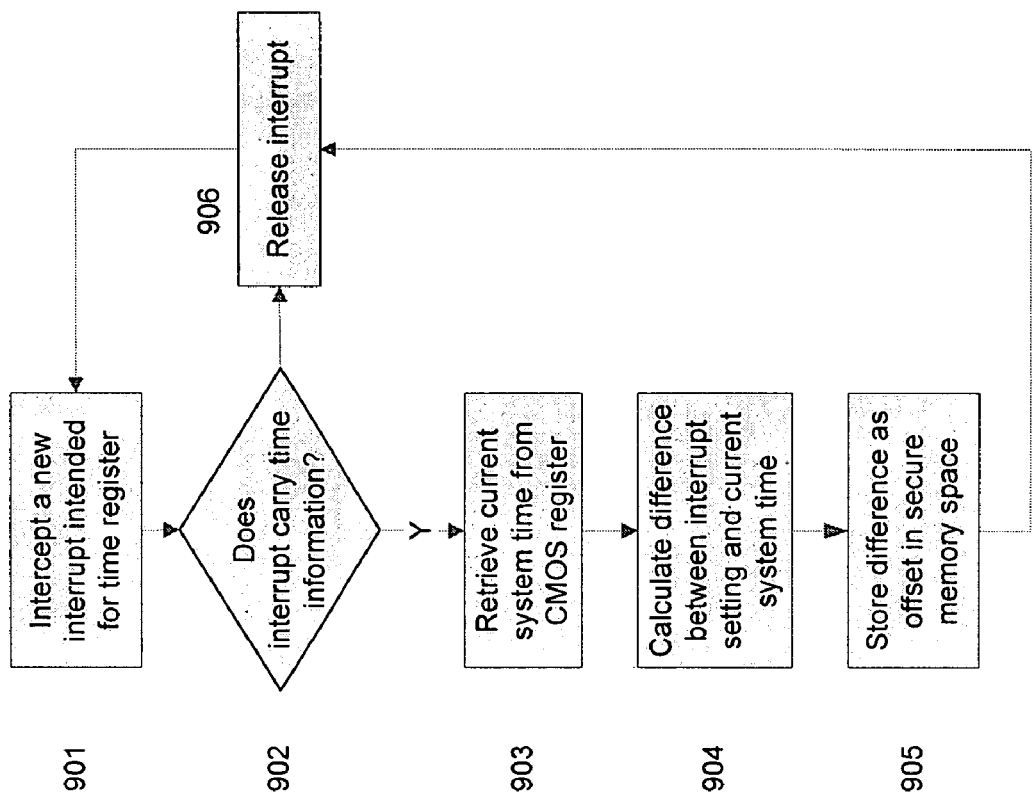
FIG. 9 illustrates a process of detecting tampering by intercepting and processing write signals to system clocks.

In existing computing systems, the RTC clock may be modified by using publicly accessible input/output (I/O) ports 70 and 71, or other designated ports. In one embodiment of the claims, commands sent to the designated ports may be intercepted and processed before being permitted to reach the RTC/CMOS registers. FIG. 9 illustrates a process for this embodiment. The process of FIG. 9 may be implemented in code, which may be called virtualization logic. The virtualization logic may also be implemented in a hardware component (discussed further below). The virtualization logic may be used to intercept write commands or interrupt signals 901 to I/O ports, where the signals may be used to modify system clock registers. The virtualization logic may determine whether the signal carry any time altering characteristics 902 before this signal/command is allowed to be further transmitted or received by the CMOS for execution. If the signal does carry some altering characteristic, such as a new time setting, the virtualization logic retrieves the current clock setting 903 (which may be retrieved from the CMOS time register) and may record a difference between the effect of the signal, such as a new time setting, and the current time of the RTC clock 904. This time difference or offset may then be stored in a secure memory space (which may be non-volatile) 905 for further use. Once the time difference is recorded, the write command may be released or permitted to reach the destination register for execution 906.

FIG. 10 further illustrates that the stored difference may then be used to determine the correct time for determining subscription expiration, e.g., whether the current 30 day/one month period has expired. This may be accomplished by checking the current time as read from the system clock against the time difference recorded in the secured memory space. FIG. 10 illustrates an integrated process diagram in which the normal subscription process of FIG. 6 is modified with the claimed system and process. Blocks 1002, 1005, 1007, 1008 of FIG. 10 correspond to blocks 602-603, 605, 606 of FIG. 6, respectively. Blocks 1003 and 1004 are added to determine an actual current time and it is this actual current time that may be compared in block 1006 to the expiration time.

Note that the stored offset may be updated each time an interrupt is sent to the CMOS clock. The offset may be a cumulative offset which captures a net time difference. For example, if the system clock was moved back by a period T, and then moved back further by a period U, the offset may represent a time difference of T+U. Also, if the time was moved back a period T and then moved forward by a period V, then the time difference saved would be T−V. Also, note that if the time had been moved back cumulatively, then the current system time may be adjusted forward by the time difference and if the time had been moved forward cumulatively, the current system time may be adjusted backward accordingly. Using the current embodiment, an actual time may be determined by adjusting the current system time by the stored offset. In short, each time the user attempts to update CMOS date/time values, the interrupt is trapped, an offset is calculated and then the interrupt is allowed to update CMOS registers. The offset may be used to estimate an actual time.

Different Hardware Implementations of the Virtualization Logic

The virtualization logic may be implemented at a firmware level or hardware level. This difference may be a design issue, but generally, firmware level implementations involve storing the virtualization logic in an executable code form for an intelligent component to execute. When the virtualization logic is implement on the hardware level, the function may be designed into a hardware device itself. Thus, depending on the implementation scenario, the claimed method and system may be implemented in a number of ways.

In one embodiment, the virtualization logic may be implemented in the hardware design of a CPU. In this embodiment, the virtualization function is part of the functionality of the CPU. In this case, any user-initiated writes to the CMOS chip may be intercepted by the CPU as part of the computer's central processing scheme.

In another embodiment, the virtualization logic may be implemented as firmware inside another hardware module such as a CMOS chip. Because the BIOS may typically read data from the CMOS a first set of instructions for the computer, the CMOS chip may be effective in hosting the virtualization logic. Alternatively, the virtualization function may be designed into the BIOS chip independent of the CMOS. In this embodiment, the time difference between the current time at the interception of the interrupt and the new write time may be captured and stored in a secure date/time register of the CMOS chip associated with an RTC clock. This register may be an unused memory space that cannot be accessed using public ports, such as the I/O ports 70 and 71 discussed above. Thus, this memory may be designated as secure because it can only be accessed by the CMOS and CPU, e.g., there is no direct access by a user. Alternatively, the stored time difference may be stored in another non-volatile, secure register that is not the CMOS register. The CMOS registers may be used to the extent they are involved in clock management, e.g., to store only the current user-time without any modification.

In another embodiment, the virtualization logic may be hardware implemented into CMOS as part of the functionality of the CMOS chip. For example, the CMOS chip may be designed on the hardware level to perform the virtualization function in addition to its regular CMOS memory storage and clock maintenance functions. In this manner, the chip itself may hold any write signals it receives, and process those signals according to the virtualization logic described before executing the write signals or commands.

In yet another embodiment, the virtualization code may be implemented on the hardware or firmware level via the license provisioning module (LPM), sometimes called a lower provisioning module. In this embodiment, the LPM may generally be used to query for the user-time (CMOS RTC time) and the offset and determine the actual time for purposes of comparison to the expiration date. The virtualization logic may be stored in and executed as part of the LPM functionality.

Power Source Tamper Prevention

In the prepaid and subscription model, an RTC CMOS clock may be relied upon by a billing process. As described previously, the CMOS clock may be sustained by an independent power source, such as a battery. When the battery starts to fail, the clock may start to lose time. Complete battery failure may cause the loss of all CMOS configuration information, including time register information. When this takes place, the system cannot be used until a new battery is installed and all CMOS configuration information is reentered. Because the battery maintaining settings can fail at any time, and viruses and power surges can also affect the CMOS configuration, clock and timer security may be susceptible to battery tampering. Thus, both the subscription model and prepaid model embodiments may still be susceptible to tampering by removing the power source used to maintain the memory. For example, a user may pull the CMOS battery, which in some PCs may reset the system-time and any saved offset will also be erased or lost when the power is removed. Thus, the claimed system may be used to protect against tampering with a battery used to power a device used to maintain timing information.

In this embodiment, the system and method implements an additional parameter which may be called a last known good time (LGT). The LGT may be a current time captured every timer interval, e.g., every minute. This LGT value may provide a bookmark time for the computer. This LGT may be recorded in a secure, non-volatile memory in addition to the system time and offset, when used, for example, with the subscription embodiment describe above. When a CMOS battery is removed, the RTC clock may be set back to a default time, e.g., Jan. 1, 1970. The LPM may be coded to check the LGT and compare the LGT against the current system time. If the LGT is much greater than system time, this may indicate that the power to the RTC clock and/or CMOS has been disrupted. The LPM may then initiate a sanction mode, such as a hardware lock mode, in which computer functionality is restricted. The LPM may be stored in a memory managed by the LPM, e.g., a flash memory, or other type of non-volatile, programmable memory that is secure from user tampering. This process is illustrated in FIG. 11. An LGT is retrieved 1101 as well as an actual (current) system time 1102. The method or system then determines whether LGT is less than the actual system time 1103, and if so, enables computer functionality 1104, stores the latest actual time as the new LGT 1105, and then waits a period before cycling the process again 1106. If the LGT is not less than the actual system time, an alarm may be raised indicating power source tampering 1107.

As illustrated in FIG. 12 the computer functionality may also be sanctioned 1202, independently or in conjunction with the alarm in blocks 1107, 1201. When a PC BIOS attempts to boot in the sanction mode (where functionality may be restricted), the BIOS may be directed to display a user interface instructing the user to contact the manufacturer or provider in order to unlock the PC 1203. The manufacturer or provider may then provide an encrypted code which is used by the PC, e.g., the LPM, to unlock the computer. This process may involve decrypting the code and/or validating the code 1204.

An additional problem, however, may exist in certain prepaid and subscription models even after a power disruption is detected or other timer tampering is detected, and that is initialization of system time. For example, simply unlocking the computer will not allow the administrator, e.g., OEM/ provider, to influence the way in which a user initializes or resets the RTC clock, or other timer. Even after a code is entered and validated, there may be no process in place for correcting the timing information resulting from the power source tampering, or other timer tampering. Thus, in an alternative embodiment, the unlock code is embedded with a time stamp that is used to reset the CMOS clock. The LPM may validate the unlock code and extract a time stamp 1205 to set the RTC clock 1206, before completely enabling system functionality 1207. In this manner, the user cannot tamper with the initialization of the RTC clock. The time stamp may be a 32-bit time value, e.g., in seconds since a fixed default time, such as Jan. 1, 1970. Additionally, the LGT may be used as a rough time setting for clock reinitialization if a time stamp cannot be used.

In an alternative embodiment a secure time server may be used to provide an LGT as illustrated in FIG. 13. In this embodiment the LPM may periodically 1301 (e.g., every few hours) query a time server for a current time by passing a request containing a random number 1302. A secure time server may respond to the request by returning to the LPM a signed (or encrypted) time packet 1303 passing back the same random number from the request and including a current time stamp from the time server. If the LPM fails to receive the time packet from the secure timer server within a period of time, the LPM may sanction the computer 1304, 1305. If the LPM successfully receives the signed time packet 1304, 1306 and upon successful validation of the time packet 1306, the LPM may extract the time stamp value and process the time stamp value as an LGT 1307. For example, the system may compare a system time with the time stamp value to ensure that the system time is at least later than the time stamp value. Validation of the time packet may involve validating a signature of the time packet and/or ensuring that the random number in the time packet matches the random number sent in the request. The use of the random number may prevent spoofing of the time packet. This embodiment may be used in combination with the process described above for checking the LGT in a secure memory. For example, the LGT obtained from the actual time calculation as described above may be performed at a shorter period (every few minutes) than from the secure time server (every few hours or days). Also, the time stamp value may replace a stored LGT value derived from a system time. Alternatively, the secure time server process may be used independently in place of the system derived LGT process.

An alternative embodiment of using a secure time server for a subscription model is illustrated in FIG. 14. In this embodiment, each time a subscription is renewed for billing period 1401 (for example, when payment is received for an additional month) a provisioning packet may be created 1402. This provisioning packet may generally contain a new expiration date on which to base the subscription timing on. In this embodiment, however, a secure time server may be queried to provide a current time stamp 1403 which may be included with (or embedded in) the provisioning packet in addition to the new expiration date 1404. The current time stamp may indicate a packet creation time. When a subscription computer receives the provisioning packet, the LPM may validate the provisioning packet 1405. The LPM may then compare the time stamp from the provisioning packet against a system time 1406. If the system time is not at least later than the time stamp from the provisioning packet, then tampering may have occurred and the LPM may implementing a sanction mode 1407. Otherwise, the LPM may simply modify the expiration date accordingly 1408.

In addition to or instead of implementing a sanction mode, the subscription computer may perform a re-initialization process in which the time stamp value is used to set the current system time. This may be based on a difference between the time stamp value and the system time. A threshold may be used, for example, to determine whether a re-initialization process may be appropriate. For example, if the current time stamp value and system value is greatly different (e.g., larger than the threshold), then a re-initialization may not be appropriate. Instead, the computer may require a dedicated validation process, such as that described above involving sanctioning the computer and using an unlock code. Also, depending on a particular implementation of a subscription process, a re-initialization process may always be performed. This may be the situation, for example, when the subscription model used may be able to control receipt of the provisioning packet from a server, such as a secure time server, within an amount of time. In other words, if there is a likely guarantee that the subscription computer will receive the provisioning packet within an N amount of time, then the system time of the computer may always be updated using the time stamp from the time server. If there is uncertainty in either time of delivery or time of processing the provisioning packet, then re-initialization may not be appropriate. The dedicated validation process may involve a synchronization process for reinitializing system time.

It should be noted that the claimed method and system for protecting against power source tampering and/or subsequent re-initialization of a system clock may be used in conjunction with both the prepaid and subscription model.

The invention claimed is:

1. A method of protecting a timer on a pay for use computer system from being improperly adjusted, the method comprising:
   establishing a baseline value for at least one timer on the pay for use computer system wherein a user pays for a time period of use of the computer system;
   determining threshold frequency differences;
   monitoring the pay for use computer system for a timer anomaly that indicates a possible improper timer adjustment by:
      determining a set of timers in the computer system; including the at least one timer;
      periodically obtaining current operating frequencies of each of the timers, respectively;
      repeatedly computing a current set of frequency differences by computing a difference between each of the current operating frequencies of the respective timers such that the current set of frequency differences includes a frequency difference between each timer and every other timer;
   detecting a timer anomaly by repeatedly comparing the frequency differences in the current set of frequency differences against the threshold frequency differences, respectively, and determining that a timer anomaly has occurred when one of the threshold frequency differences is exceeded by a corresponding current frequency difference;
   imposing a sanction if the timer anomaly is detected wherein the sanction comprises limiting functionality of the computer system and leaving the computer system in a reduced functioning operating state.

2. The method of claim 1, wherein determining a set of timers comprises determining all timers in the computer that are capable of affecting a metering program.

3. The method of claim 1, wherein the threshold is periodically recalculated.

4. The method of claim 1, wherein monitoring the computer system for a timer anomaly comprises intercepting a clock adjustment signal that is being transmitted to a timer and wherein establishing a baseline value comprises determining a current clock value when the clock adjustment signal is intercepted.

5. The method of claim 4, further comprising storing an offset that is based on a difference between the current clock value and the clock adjustment signal and allowing the clock adjustment signal to be received by the real time clock when the offset is determined and stored.

6. The method of claim 5, further comprising determining a current actual time based on a current clock value and the stored offset.

7. The method of claim 5, wherein the offset is a cumulative offset that is updated each time a clock adjustment signal is intercepted and processed.

8. The method of claim 1, wherein monitoring the computer system for a timer anomaly comprises determining a last known good time value and storing the last known good time value, and periodically determining a difference between the last known good time value and a current system time value.

9. The method of claim 8, wherein a timer anomaly is detected when the last known good time value is determined to be less than the current time value by a threshold.

10. The method of claim 8, wherein determining a last known good time comprises obtaining a time value from a secure time server.

11. The method of claim 10, wherein a last known good time value is received upon renewing a subscription.

12. The method of claim 1, wherein the sanction further comprises limiting computer functionality to inputting and processing an unlock code.

13. The method of claim 12, wherein the unlock code contains a time value for reinitializing a system time.

14. The method of claim 13, further comprising reinitializing the system time based on the time value and unrestricting computer functionality based on a successful validation of the unlock code and successful re-initialization of the system time.

15. A computer-readable storage medium, wherein the computer-readable storage medium is not a signal, physically configured to store computer-executable instructions for performing operations comprising:

determining a set of timers in a computer system;

establishing a baseline value for at least one timer on the computer system comprising determining a threshold frequency difference;

monitoring the computer system for a timer anomaly that indicates a possible improper timer adjustment, the monitoring comprising:

repeatedly measuring a set of frequency differences between the timers in the set of timers by obtaining operating frequencies of the timers and subtracting the operating frequencies, the operating frequencies comprising clock frequencies of the timers;

repeatedly comparing the frequency differences against the threshold frequency difference to detect when the threshold frequency difference has been exceeded, and when so detected determining that a timer anomaly has occurred;

issuing signal responsive to the determining that a timer anomaly has occurred;

in response to the signal, operating the computer system in a reduced functioning state wherein the computer system is still operable by a user but with reduced functionality.

* * * * *